US007963017B2

(12) United States Patent
Ehleiter et al.

(10) Patent No.: US 7,963,017 B2

(45) Date of Patent: Jun. 21, 2011

(54) METHOD FOR TIGHTENING A SCREWED JOINT ON A COMPONENT IN AN AUTOMATED MANNER, AND SUITABLE INDUSTRIAL ROBOT SYSTEM

(75) Inventors: Jürgen Ehleiter, Remshalden (DE); Willi Klumpp, Ostifildern (DE); Uwe Pfister, Leutenbach (DE); Thomas Prager, Stuttgart (DE); Michael Schunko, Ludwigsburg (DE)

(73) Assignee: Daimler AG, Stuttgart (DE)

(*) Notice: Subject to any disclaimer, the term of this patent is extended or adjusted under 35 U.S.C. 154(b) by 1200 days.

(21) Appl. No.: 10/579,696

(22) PCT Filed: Oct. 29, 2004

(86) PCT No.: PCT/EP2004/012289

§ 371 (c)(1), (2), (4) Date: Jan. 8, 2007

(87) PCT Pub. No.: WO2005/049286

PCT Pub. Date: Jun. 2, 2005

(65) Prior Publication Data

US 2007/0214919 A1 Sep. 20, 2007

(30) Foreign Application Priority Data

Nov. 19, 2003 (DE) .................................. 103 54 079

(51) Int. Cl.
*B23Q 17/00* (2006.01)

(52) U.S. Cl. ............... 29/407.02; 29/407.01; 29/407.05; 29/525.11; 29/709; 29/714; 901/16; 81/57.4

(58) Field of Classification Search ............... 29/407.01, 29/407.02, 407.05, 525.11, 709, 714; 901/16; 81/57.4

See application file for complete search history.

(56) References Cited

FOREIGN PATENT DOCUMENTS

| | | | |
|---|---|---|---|
| DE | 34 16 227 C2 | | 1/1992 |
| DE | 695 25 008 T2 | | 11/2002 |
| DE | 202 08 060 U1 | | 10/2003 |
| EP | 1 312 996 A2 | | 5/2003 |
| JP | 59 187430 A | | 10/1984 |
| JP | 60 185678 A | | 9/1985 |
| JP | 09 150326 A | | 6/1997 |
| JP | 09150326 A | * | 6/1997 |

* cited by examiner

*Primary Examiner* — Derris H Banks
*Assistant Examiner* — Azm Parvez
(74) *Attorney, Agent, or Firm* — Patent Central LLC; Stephan A. Pendorf

(57) ABSTRACT

The method is used for automated tightening of a screwed joint (16), which is fitted to a component (10) in advance and contains a screw (12) and a nut (14), using a programmable industrial robot system (18). In this case, the invention provides that the industrial robot system (18) has a first robot (20) with a screw driving head (22) and a second robot (24) with a mating holding head (26). In order to tighten the screwed joint (16) on the component (10), the screw driving head (22) is positioned in a defined screw driving position, and the mating holding head (26) is positioned in a defined mating holding position in order to produce an interlocking connection, which is suitable for tightening of the screwed joint (16), between the mating holding head (26) and the nut (14), as well as between the screw driving head (22) and the screw (12). The screwed joint (16) on the component (10) is tightened with a predeterminable fixing torque. The interlocking connections are then disconnected.

17 Claims, 2 Drawing Sheets

18
20
22
32
12
16
14
29
34
26
24
18
10
28
30
X
Y
Z

METHOD FOR TIGHTENING A SCREWED JOINT ON A COMPONENT IN AN AUTOMATED MANNER, AND SUITABLE INDUSTRIAL ROBOT SYSTEM

CROSS REFERENCE TO RELATED APPLICATION

This application is a national stage of PCT/EP2004/012289 filed Oct. 29, 2004and based upon DE 103 54 079.2 filed on Nov. 19, 2003 under the International Convention.

BACKGROUND OF THE INVENTION

1. Field of the Invention

The invention relates to a method for automated tightening of a screwed joint, which is fitted to a component in advance and contains a screw and a nut, using a programmable industrial robot system and relates to an industrial robot system, as described hereinafter.

2. Description of Related Art

Methods and industrial robot systems of the type mentioned initially are known. By way of example, DE 34 16 227 C2 discloses a robot for repeated tightening of screws based on different working patterns, which depend on the position of the threaded holes and the diameter of the screws. The procedures are stored in advance in a memory. The robot is combined with automatic machine tools in order to carry out a cooperative production process. A suitable control apparatus is provided in order to synchronize and coordinate the robot and the machine tools.

SUMMARY OF THE INVENTION

One object of the invention is to propose an alternative method for automated tightening of a screwed joint on a component. A further object of the invention is to specify a suitable industrial robot system for carrying out the method.

A method having the features as set forth below is proposed in order to achieve the object. The method according to the invention is distinguished in that the industrial robot system has a first robot with a screw driving head and a second robot with a mating holding head, with the following method steps being carried out in order to tighten the screwed joint on the component:

- positioning of the screw driving head in a defined screw driving position and of the mating holding head in a defined mating holding position during the production of an interlocking connection, which is suitable for tightening of the screwed joint, between the mating holding head and the nut and between the screw driving head and the screw;
- tightening of the screwed joint on the component with a predeterminable fixing torque;
- disconnection of the interlocking connections by means of a respective relative movement of the screw driving head and of the mating holding head away from the tightened screwed joint.

One robot is thus provided in each case both for the screw and for the nut, which robots allow automated tightening of the screwed joint on the component. The method is flexibly suitable for tightening different screwed joints, in each case comprising a screw and a nut, on a component, since provision is made for the use of two robots, which cooperate with one another, for this purpose. The robots can be programmed in advance relatively easily and quickly in order to ensure correct and automated tightening of different screwed joints on one component. There is now no need to use screwed-joint-specific industrial installations which may possibly be relatively complex and cannot be used without a relatively large amount of effort for automated tightening of, for example, a screwed joint which is positioned and/or configured in a different way.

The mating holding head is advantageously mounted in a floating manner on the second robot. In particular, the mating holding head is mounted in a floating manner in the direction of its three mutually perpendicular main coordinate axes, with a defined zero position. In this case, the mating holding head can be pressed in the direction of the zero position, on assuming a respective deflection position from the zero position, by means of an appropriately acting resilient restoring force. The floating mounting of the mating holding head on the second robot makes it possible to compensate relatively easily in particular for position tolerances of the already assembled screwed joint on the component, in order to make it possible to produce a correct interlocking connection between the mating holding head and the nut of the screwed joint. Because of the possible automatic deflection of the mating holding head from the zero position, the interlock can be produced quickly and without damage by means of a suitable positioning movement of the second robot.

The mating holding head can be mounted in a floating manner within a pivoting angle about a rotation axis which extends parallel to the screw longitudinal axis. The pivoting angle may in this case be only a few degrees, for example ±2°, and assists the production of a quick and correct interlocking connection between the mating holding head and the nut, since the pivoting movement of the mating holding head makes it possible to avoid tilting during production of the interlocking connection. The pivoting angle can preferably be predetermined.

According to one preferred embodiment variant, the screw driving head can be moved back against a resilient restoring force during the positioning to the defined screw driving position and during the production of the interlocking connection relative to the first robot on a main coordinate axis which corresponds to the screw rotation axis, and is fixed inflexibly on the first robot on the other main coordinate axis. This makes it possible to achieve an autonomous, latching-in interlocking connection between the screw driving head and the screw during the production of a surface contact, which is loaded with a spring force, between the screw driving head (tool) and the screw by means of suitable movement of the screw driving head relative to the screw. In order to produce the interlocking connection, the screw driving head can carry out a defined search routine movement with a virtually permanent end surface contact between the screw driving head and the screw. This search routine movement of the first robot can be pre-programmed and, in particular, can cover the initial assembly range that is possible and/or is to be expected of the screw on the component. In consequence, position tolerances of the screw relative to the component do not have any negative effect on the automated screw-joining process, and in particular on the production of the interlocking connection between the screw driving head and the screw.

The screw driving head advantageously has a screw driving spindle with a screw driving tool, with the screw driving spindle carrying out a rotary movement about the screw driving spindle axis, which is relatively slow with respect to the tightening of the screwed joint, in order to produce the interlocking connection of the screw driving tool with the screw. The rotary movement assists the quick production of a correct interlocking connection between the screw driving tool and the screw. The screw may, for example, be a hexagonal screw (with an external hexagonal shape), or an internal hexagonal screw, or else a screw with a cruciform slot, in which case the screw driving tool must be configured in a corresponding manner.

The torque which is acting is advantageously determined in order to identify the interlocking connection between the screw driving head and the screw with the torque rising suddenly when the interlock is produced. Since the screw driving tool carries out a rotary movement, which is relatively slow with respect to the tightening of the screwed joint, about the screw driving spindle axis in order to produce the interlocking connection, the production of the interlocking connection must be identified first of all before the actual tightening of the screwed joint can start. When the torque acting on the screw driving head rises suddenly while carrying out the slow rotary movement, an interlocking connection must be present both between the screw driving head and the screw and between the mating holding head and the nut. A torque rise such as this can be identified technically relatively easily and quickly by means of a suitable sensor device.

Once the interlocking connection has been produced between the mating holding head and the nut and between the screw driving head and the screw, a completely floating bearing is advantageously activated for the screw driving head (in particular on all of its three main coordinate axes) on the first robot. This ensures that the first robot does not transmit any interfering forces to the screwed joint while it is being tightened. This is important because the screwed joint is just initially fitted to the component and can possibly move slightly relative to the component during the tightening process, with a relative movement such as this not being impeded by any external force effect owing to the floating bearing of the screw driving head on the first robot. In particular, this prevents tilting and possibly damage to the screwed joint by the first robot.

The screw driving head is preferably mounted in a floating manner in the direction of its three mutually perpendicular main coordinate axes, with a defined zero position. In this case, the screw driving head can be pressed in the direction of the zero position, on assuming a respective deflection position from the zero position, by means of an appropriately acting resilient restoring force. A floating bearing such as this can be implemented relatively easily on an industrial robot system and is distinguished by high reliability and speed.

During the tightening of the screwed joint, the torque which is acting is advantageously determined in order to identify a possibly damaged screwed joint. In this case, in the event of a damaged screwed joint, the torque which is acting would rise noticeably in comparison to a correct screwed joint. The automated method for tightening a screwed joint on a component thus contributes to quality assurance, since damaged screwed joints are in fact determined during the tightening of the screwed joint.

According to one preferred embodiment variant, after production of the predetermined fixing torque on the screwed joint, and before the disconnection of the interlocking connection between the mating holding head and the nut, the mating holding head is rotated within a predeterminable rotation angle range in the opposite direction to the fixing rotation direction of the nut, in order to relieve the stress on it. This ensures that the screwed joint is not damaged by the disconnection of the interlocking connection between the mating holding head and the nut.

The first robot and the second robot preferably each have a control system which control systems interchange data with one another relating to the assumption of the screw driving position, the mating holding position and the completion of the screwed joint. In this case, the data is interchanged between the control systems in particular to coordinate the two robots, since the screw driving head must be arranged in a defined screw driving position and the mating holding head must be arranged in a defined mating holding position in order to ensure correct tightening of the screwed joint. The first and the second robot thus represent two initially mutually independent assembly systems, which are suitable for cooperation on the basis of the data interchange that takes place between the associated control systems.

The deflection position of the screw driving head and/or the mating holding head relative to the defined zero position is determined quantitatively in order to carry out quality control with respect to the position tolerance of the screwed joint on the component. This information may be useful for quality assurance purposes, in particular for the initial assembly of the screwed joint on the component and/or for component manufacture.

If required, the screw driving head can advantageously carry out an automated tool change at a tool magazine. The capability for an automated tool change on the screw driving head allows particularly flexible and fast assembly of a screwed joint on a component by means of an industrial robot system.

The object is furthermore achieved by an industrial robot system. The industrial robot system is distinguished in that it has a first programmable robot with a screw driving head, and a second programmable robot with a mating holding head, and in that the mating holding head is mounted in a floating manner with a defined zero position in the direction of its three mutually perpendicular main coordinate axes, and the screw driving head is provided with a corresponding floating bearing, which can be activated at times, on at least two main coordinate axes, and in that the screw driving head has a screw driving spindle with a screw driving tool, and the mating holding head is provided with an open-ended wrench. An industrial robot system such as this makes it possible to achieve the advantages already mentioned with respect to the method.

The screw driving tool and the open-ended wrench are advantageously fixed on the associated robot head such that they can be replaced non-destructively. In this case, automated replacement of the screw driving tool and of the open-ended wrench is, in particular, provided. The industrial robot system is in consequence distinguished by particularly high flexibility with respect to its usage capabilities for automated tightening of different screwed joints on a component.

The open-ended wrench may have an axial stop for the nut. The axial stop is used to ensure an interlocking connection in a defined position between the open-ended wrench and the nut, since the open-ended wrench is mounted in a floating manner in this axial direction on the second robot thus assisting auto-centering positioning of the open-ended wrench relative to the nut in the presence of a resilient restoring force. As an alternative to this, the nut may have an axial stop for the open-ended wrench.

BRIEF DESCRIPTION OF THE DRAWINGS

Further advantages of the invention will become evident from the description.

The invention will be explained in more detail using one preferred exemplary embodiment and with reference to the schematic drawing, in which.

DETAILED DESCRIPTION OF THE INVENTION

Figure 1:
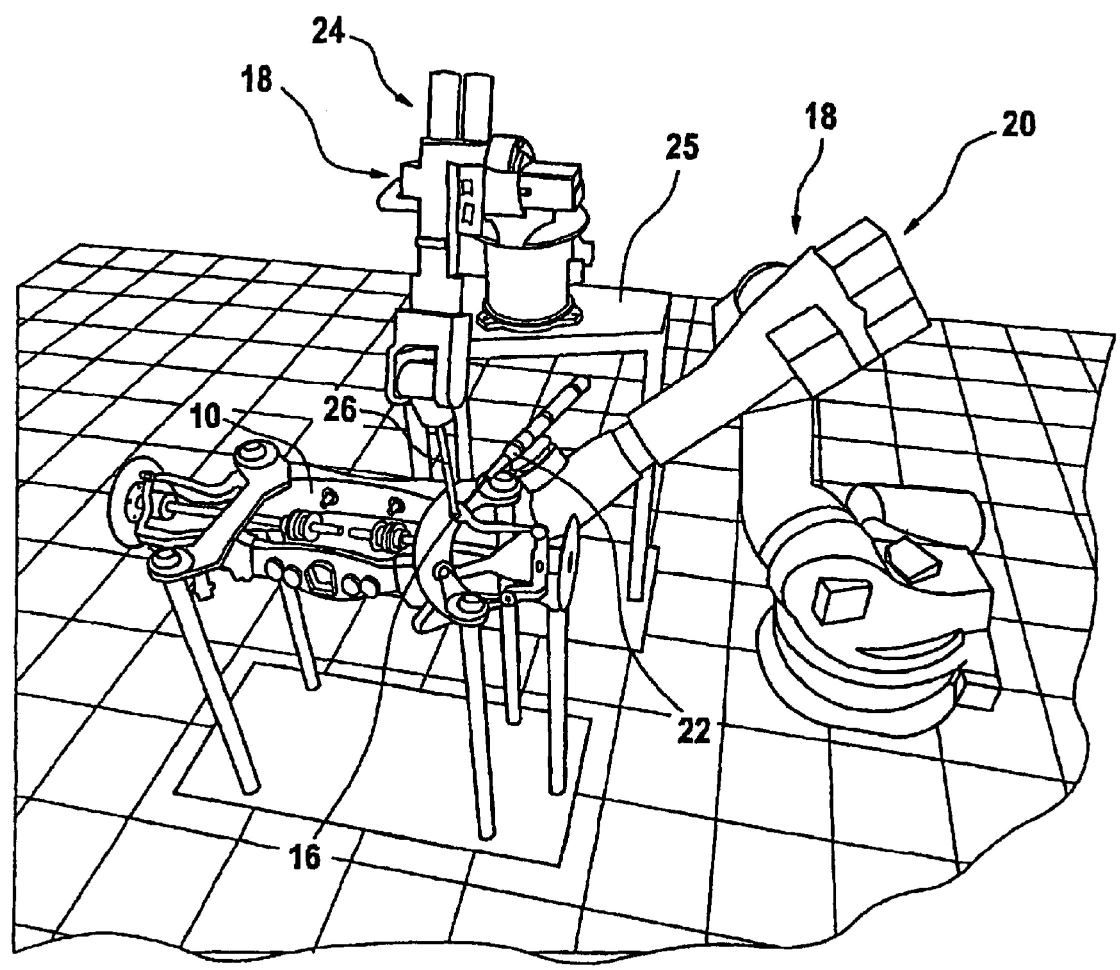
FIG. 1 shows a schematic perspective illustration of an industrial robot system for automated tightening of a screwed joint on a component.

FIG. 1 shows a schematic perspective illustration of an industrial robot system 18 with a first robot 20 (screw driving robot) and a second robot 24 (mating holding robot). The robots 20, 24 are each in the form of six-axis industrial robots with a vertical bending arm. The programmable robots 20, 24 are used for automated tightening of a screwed joint 16 which is initially fitted on a component 10. In the case of the illustrated exemplary embodiment, the component 10 is an initially fitted rear axle for a vehicle, in which case the screwed joint 16 which is initially fitted on the component 10 is intended to be tightened in an automated manner by means of the robot system 18 in order to complete the rear axle. The first robot 20 is for this purpose provided with a screw driving head 22, while the second robot 24 has a suitable mating holding head 26. In order to ensure improved accessibility to the screwed joint point on the component 10, the second robot 24 is positioned on a base 25. The first robot 20 is in contrast arranged directly on the floor.

Figure 2:
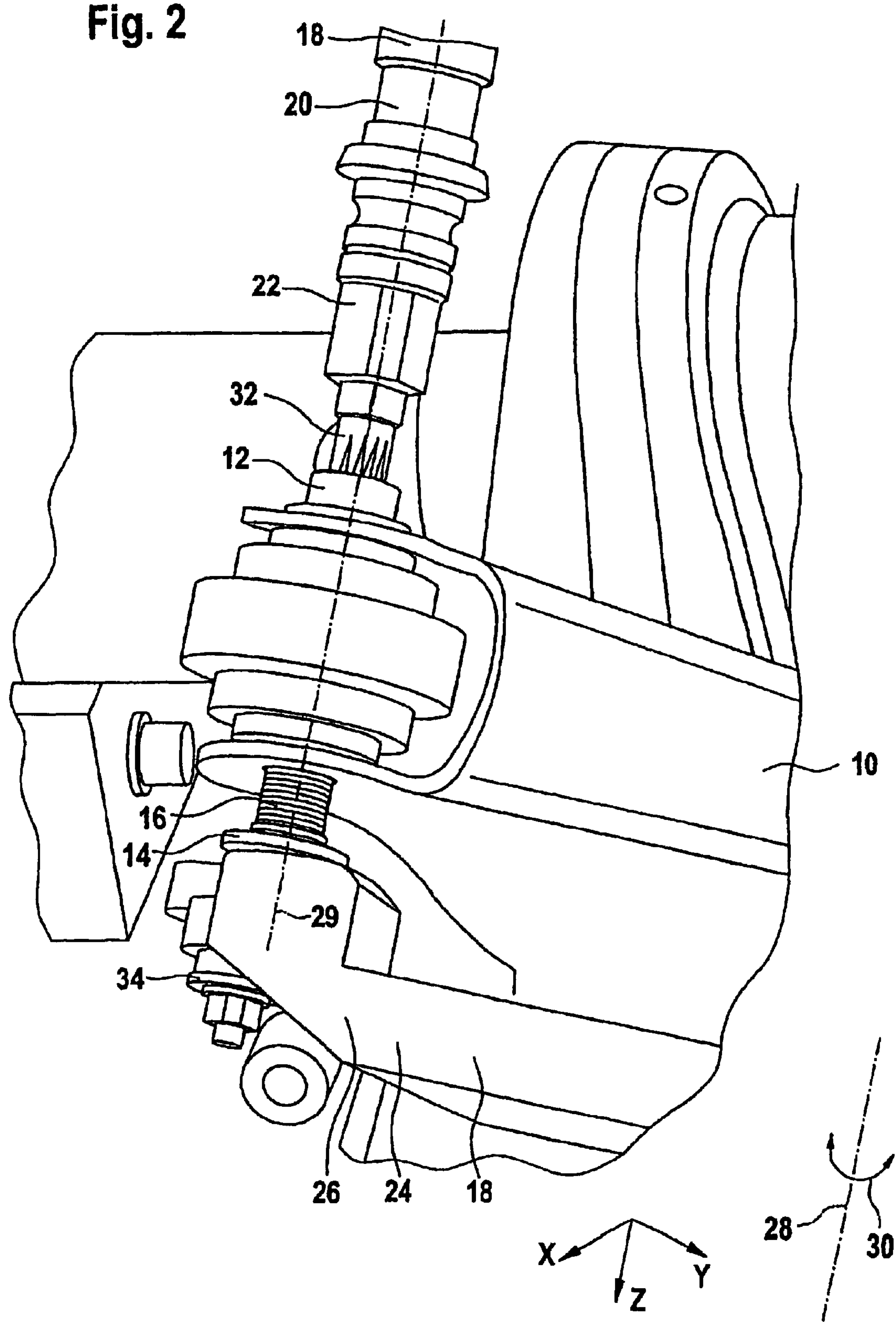
FIG. 2 shows a schematic perspective illustration of the screwed joint and of a part of the industrial robot system, on a larger scale.

FIG. 2 shows the screwed joint 16 on an enlarged scale on the component 10, in which case the screwed joint 16 still has to be tightened by means of the industrial robot system 18. The screwed joint 16 comprises a screw 12 in the form of a cylindrical bolt with a cruciform slot and with a flat collar, and a nut 14 in the form of a hexagonal nut with a flat collar.

The mating holding head 26 is provided with a suitable open-ended wrench 34, which forms an interlocking connection with the nut 14. In this case, the mating holding head 26 is mounted in a floating manner on the second robot 24 with a defined zero position, in the direction of its three mutually perpendicular main coordinate axes X, Y, Z. On assuming a respective deflected position, the mating holding head 26 is pressed in the direction of the zero position by means of an appropriately acting resilient restoring force. The floating bearing can be produced on the second robot 24 for example by means of a pneumatic cylinder system, with the inclusion of proportional valves. The mating holding head 26 is furthermore mounted in a floating manner within a defined pivoting angle (double-headed rotating arrow 30) about a rotation axis 28 which extends parallel to the screw longitudinal axis 29.

The screw driving head 22 contains a screw driving tool 32 which is connected in an interlocking manner to the screw 12. For automated tightening of the screwed joint 16 on the component 10, the screw driving head 22 is provided with a screw driving spindle, by means of which the screw driving tool 32 can be caused to carry out a rotary movement about the screw longitudinal axis 29. The screw driving head 22 is mounted in a floating manner relative to the first robot 20 on the main coordinate axis Z (in the screw driving position corresponding to the screw longitudinal axis 29), and in particular can be moved back relative to the first robot 20 against a resilient restoring force. Furthermore, during its positioning in the defined screw driving position on the main coordinate axes X, Y, the screw driving head 22 is fixed inflexibly relative to the first robot 20, while it is also offset in the direction of the main coordinate axes X, Y in a floating bearing relative to the first robot 20, once the interlocking connection with the screw 12 has been produced. For this purpose, the industrial robot system 18 is provided with a control system, by means of which the first robot 20 and the second robot 24 can interchange data with one another, in particular with regard to the assumption of the screw driving position of the first robot 20, the mating holding position of the second robot 24, and the completion of the screwed joint 16 on the component 10.

For automated tightening of the initially fitted screwed joint 16 on the component 10 by means of the programmable industrial robot system 18, the screw driving head 22 is fixed inflexibly in its zero position relative to the first robot 20 on its main coordinate axes X, Y, while it is mounted in a floating manner in the direction of its main coordinate axis Z. At the same time, the mating holding head 26 of the second robot 24 is mounted in a floating manner in the direction of all three main coordinate axes X, Y, Z, and is likewise at its defined zero position. With this positioning setting, the first robot 20 moves to its screw driving position, and the second robot 24 moves to its mating holding position. In this case, the position of the initially fitted screwed joint 16 is programmed in on the industrial robot system 18, taking account of the permissible discrepancies, and the discrepancies to be expected, on the component 10. Once the first robot 20 has assumed the screw driving position, the screw driving spindle is caused to carry out a rotary movement, which is relatively slow with reference to the tightening of the screwed joint 16, about the screw driving spindle axis (main coordinate axis Z), and at the same time carries out a search routine movement of the screw driving head 22 relative to the screw 12. This assists the automatic formation of a correct interlocking connection between the screw driving head 22 and the screw driving tool 32 and the screw 12, since the screw driving tool 32 is permanently moved back in the direction of the first robot 20 in the direction of the main coordinate axis Z, against a resilient restoring force. If the screw driving tool 32 is arranged coaxially relative to the screw 12 in the course of the search routine movement of the first robot 20, the screw driving tool 32 is automatically moved in the direction of the screw 12 by virtue of the resilient restoring force which acts in the direction of the screw longitudinal axis 29 (the main coordinate axis Z), (latching-in movement), forming the desired interlocking connection. The superimposed rotary movement of the screw driving tool 32 about the main coordinate axis Z in this case ensures the production of a correct interlocking connection between the screw driving tool 32 and the screw 12.

During the production of the interlocking connection between the screw driving tool 32 and the screw 12, the screw 12 is likewise rotated in a corresponding manner about the screw longitudinal axis 29 together with the initially fitted nut 14, with this rotary movement of the nut 14 assisting the production of a correct interlocking connection between the nut 14 and the open-ended wrench 34, since the open-ended wrench 34 is at this time in surface contact with the nut 14, and is possibly moved back in the direction of the main coordinate axis Z in the direction of the second robot 24, so that it is pressed against the nut 14 permanently by means of a resilient restoring force that acts. The open-ended wrench 34 can now automatically be moved onto the rotating nut 14 using three degrees of freedom (in the direction of the main coordinate axes X, Y, Z).

The resilient restoring forces on the screw driving tool 32 and on the open-ended wrench 34, and the relative rotational movements between the screw driving tool 32 and the screw 12 as well as between the nut 14 and the open-ended wrench 34 thus allow the formation of an automatic, fast and reliable interlocking connection. Since the screwed joint 16 is generally initially fitted to the component 10 subject to tolerances, the described procedure for production of the interlocking connection has a particularly advantageous effect on the screwed joint 16. During the process, the search routine movement for the first robot 20 can be programmed into the control system relatively simply, matched to the respective tolerance which is present or is to be expected, in particular with respect to the arrangement of the screwed joint 16 on the component 10.

When a correct interlocking connection is present between the screw driving tool 32 and the screw 12, as well as between the open-ended wrench 34 and the nut 14, an abrupt rise in the torque which is acting or has to be applied can be identified by means of a suitable sensor system on the first robot 20. This means that the positioning phase of the first robot 20 and of the second robot 24 can be regarded as being complete, so that the tightening phase of the screwed joint 16 can now start. For this purpose, the screw driving head 22 or the screw driving tool 32 is also mounted in a floating manner relative to the first robot 20 with respect to the main coordinate axes X and Y, so that the industrial robot system 18 is switched without any disturbance forces relative to the screwed joint 16. The screw driving spindle of the screw driving head 22 can now carry out a rotary movement about the screw driving spindle axis Z at a relatively high speed in order to tightened the screwed joint 16 as quickly as possible.

Once the screwed joint 16 has been sufficiently firmly tightened on the component 10, the interlocking connection on the screw 12 is released by means of a relative movement of the screw driving tool 32 in the direction of the main coordinate axis Z away from the screw 12, and the interlocking connection on the nut 14 is released by means of a corresponding relative movement of the open-ended wrench 34 in the direction of the main coordinate axis Z away from the nut 14. If required, before this relative movement, the open-ended wrench 34 can be pivoted through about 2 degrees about the screw longitudinal axis 29 in the opposite direction to the rotation direction in which the nut is tightened, in order to relieve the stress of the existing surface pressure contact between the open-ended wrench 34 and the nut 14. Correct release of the interlocking connections of the screw driving tool 32 and of the open-ended wrench 34 relative to the screwed joint 16 can be determined, if required, by means of a suitable sensor system.

The industrial robot system 18, which is now no longer in contact with the screwed joint 16 and thus with the component 10, can now be prepared for a further tightening process for a screwed joint, by once again mounting the screw driving head 22 in a floating manner by means of an appropriate circuit on the first robot 20, in the direction of the main coordinate axes X, Y. If required, a tool magazine (not illustrated in the figures) can also be provided, in particular allowing automated tool changes on the first robot 20 and/or on the second robot 24. The zero-position deflection of the screw driving head 22 and of the mating holding head 26 during the production of the respective interlocking connection and during the tightening of the screwed joint 16 on the component 10 can if required be recorded quantitatively by means of suitable sensors in order to carry out quality control with respect to the respective position of a screwed joint 16 relative to a component 10. Furthermore, with the assistance of this determined data, it is possible for the control program for the first robot 20 and for the second robot 24 to be matched to the respective previously occurring position tolerances during the tightening process of the screwed joint 16, in each case with respect to the positioning of the screw driving head 22 and of the mating holding head 26, relative to the screwed joint 16 on the component 10. In addition, the search routine movement of the first robot 20 can be matched to these tolerance values, which may vary (position tolerances of the screwed joint 16 relative to the component 10). Furthermore, the torque which is determined on the screw driving head 22 of the first robot 20 can be used during the tightening of the screwed joint 16 to verify possibly incorrectly tightened screwed joints, by defining a minimum torque and a maximum torque for identification of a permissible tightening torque interval within which tightening torque values are located which make it possible to deduce the presence of a correctly tightened screwed joint. By way of example, a suitable foce measurement device can be integrated in the screw driving head 22 and/or in the mating holding head 26 for torque measurement.

The industrial robot system 18 allows relatively simple reprogramming of the control program for changing component geometries and/or screwed-joint parameters. Furthermore, the industrial robot system is composed predominantly of standard components, which are distinguished by a particularly good accessibility, for example for maintenance work, and by a high degree of flexibility with regard to their capabilities for use, in particular within series production.

Now that the invention has been described, we claim:

1. A method for automated tightening of a screwed joint (16), which is fitted to a component (10) in advance and includes a screw (12) and a nut (14), using a programmable industrial robot system (18), wherein the industrial robot system (18) has a first robot (20) with a screw driving head (22) and a second robot (24) with a mating holding head (26), with the following method steps being carried out in order to tighten the screwed joint (16) on the component (10):

positioning of the screw driving head (22) in a defined screw driving position and of the mating holding head (26) in a defined mating holding position for forming a form-fitting connection between the mating holding head (26) and the nut (14) and between the screw driving head (22) and the screw (12) during the tightening of the screwed joint (16);

tightening of the screwed joint (16) on the component (10) with a predeterminable fixing torque;

disconnecting the interlocking connections by means of a respective relative movement of the screw driving head (22) and of the mating holding head (26) away from the tightened screwed joint (16), wherein the screw driving head (22) is provided with a corresponding floating bearing, which can be activated at times, on at least two main coordinate axes (X, Y), and wherein during its positioning in the defined screw driving position on the main coordinate axes X, Y, the screw driving head 22 is fixed inflexibly relative to the first robot 20, while it is also offset in the direction of the main coordinate axes X, Y in a floating bearing relative to the first robot 20, once the interlocking connection with the screw 12 has been produced.

2. The method as claimed in claim 1, wherein the mating holding head (26) is mounted in a floating manner on the second robot (24).

3. The method as claimed in claim 2, wherein the mating holding head (26) is mounted in a floating manner in the direction of its three mutually perpendicular main coordinate axes (X, Y, Z), with a defined zero position.

4. The method as claimed in claim 3, wherein the mating holding head (26) is pressed in the direction of the zero position, on assuming a respective deflection position from the zero position, by means of an appropriately acting resilient restoring force.

5. The method as claimed in claim 1, wherein the mating holding head (26) is mounted in a floating manner within a pivoting angle (30) about a rotation axis (28) which extends parallel to the screw longitudinal axis (29).

6. The method as claimed in claim 1, wherein the screw driving head (22) can be moved back against a resilient restoring force during the positioning to the defined screw driving position and during the production of the interlocking connection relative to the first robot (20) on a main coordinate axis (Z) which corresponds to the screw rotation axis, and is fixed inflexibly on the first robot (20) on the other main coordinate axes (Y, Z).

7. The method as claimed in claim 6, wherein the screw driving head (22) carries out a defined search routine movement in order to produce the interlocking connection, with a virtually permanent end surface content between the screw driving head (22) and the screw (12).

8. The method as claimed in claim 1, wherein the screw driving head (22) has a screw driving spindle with a screw driving tool (32), with the screw driving spindle carrying out a rotary movement about the screw driving spindle axis (Z), which is relatively slow with respect to the tightening of the screwed joint (16), in order to produce the interlocking connection of the screw driving tool (32) with the screw (12).

9. The method as claimed in claim 1, wherein the torque which is acting is determined in order to identify the interlocking connection between the screw driving head (22) and the screw (12) with the torque rising suddenly when the interlock is produced.

10. The method as claimed in claim 1, wherein a completely floating bearing for the screw driving head (22) on the first robot (20) is activated after production of the interlocking connection between the mating holding head (26) and the nut (14), and between the screw driving head (22) and the screw (12).

11. The method as claimed in claim 10, wherein the screw driving head (22) is mounted in a floating manner, with a defined zero position, in the direction of its three mutually perpendicular main coordinate axes (X, Y, Z).

12. The method as claimed in claim 11, wherein the screw driving head (22) is pressed in the direction of the zero position, on assuming a respective deflection position from the zero position, by means of an appropriately acting resilient restoring force.

13. The method as claimed in claim 1, wherein the torque which is acting during the tightening of the screwed joint (16) is determined in order to identify a possibly damaged screwed joint (16).

14. The method as claimed in claim 1, wherein after production of the predetermined fixing torque on the screwed joint (16), and before the disconnection of the interlocking connection between the mating holding head (26) and the nut (14), the mating holding head (26) is rotated within a predeterminable rotation angle range in the opposite direction to the fixing rotation direction of the nut (14), in order to relieve the stress on it.

15. The method as claimed in claim 1, wherein the first robot (20) and the second robot (24) each have a control system, which control systems interchange data with one another relating to the assumption of the screw driving position, the mating holding position and the completion of the screwed joint (16).

16. The method as claimed in claim 1, wherein the deflection position of the screw driving head (22) and/or the mating holding head (26) relative to the defined zero position is deteimined quantitatively in order to carry out quality control with respect to the position tolerance of the screwed joint (16) on the component (10).

17. The method as claimed in claim 1, wherein the screw driving head (22) carries out an automated tool change at a tool magazine when required.

* * * * *